(No Model.)

B. L. MITCHELL.
TETHER.

No. 379,485. Patented Mar. 13, 1888.

Witnesses.
M. A. Barnes.
Van Buren Hillyard.

Inventor:
Benj. L. Mitchell.
By R. S. & A. P. Lacey.
Attys.

UNITED STATES PATENT OFFICE.

BENJAMIN LEE MITCHELL, OF WILTON, WISCONSIN.

TETHER.

SPECIFICATION forming part of Letters Patent No. 379,485, dated March 13, 1888.

Application filed August 10, 1887. Serial No. 246,590. (No model.)

*To all whom it may concern:*

Be it known that I, BENJAMIN LEE MITCHELL, a citizen of the United States, residing at Wilton, in the county of Monroe and State of Wisconsin, have invented certain new and useful Improvements in Tethers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to tethers or devices for restraining animals within certain limits while grazing, and has for its object to simplify and improve this class of devices and appliances, whereby two or more animals may be kept separated and confined within certain limits.

The improvement consists in the novel and peculiar construction and arrangement of parts, which will be more fully hereinafter set forth and claimed, and shown in the annexed drawings, in which—

Figure 1:
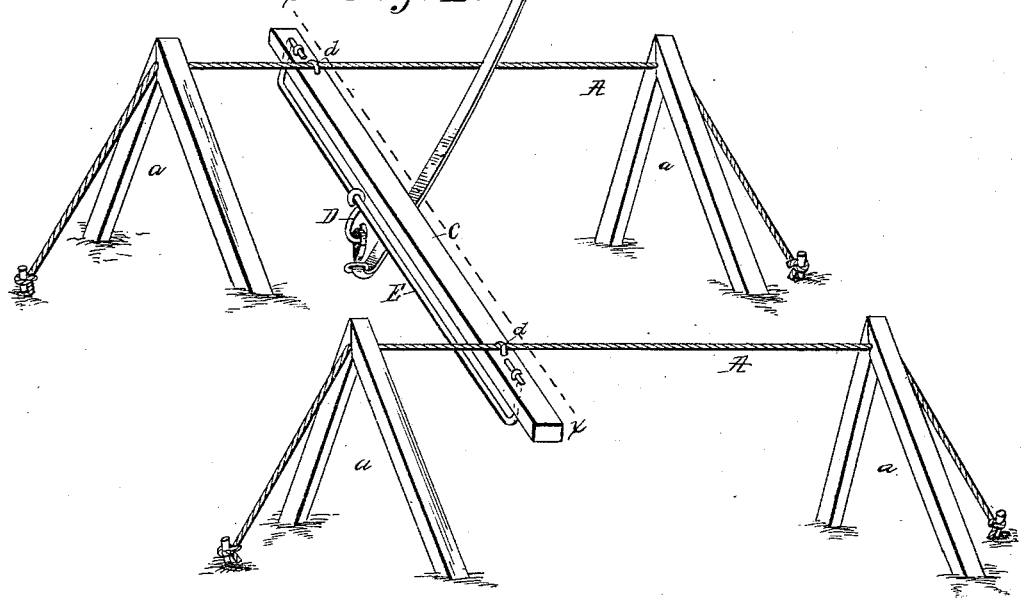
Figure 2:
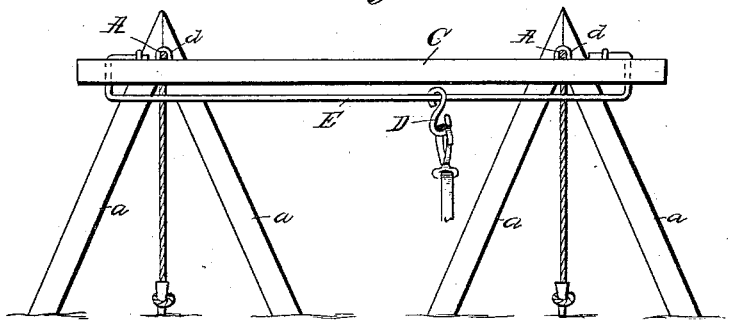

Figure 1 is a perspective view of a tether embodying my invention, and Fig. 2 a section on the line X X of Fig. 1.

The ropes or wires A are anchored at each end to the ground and pass over braces $a$, which support them at any desired distance above the ground. The cross-bar carrier or yoke C is supported at each end upon the wires by the eyelets $d$ in such a manner that it can slide back and forth thereon. The ring or link D, to which the halter-strap is fastened, is mounted and slides on the guide-rod E, secured at each end to the ends of the cross-bar or yoke. The animal haltered to the link D can move back and forth the length of the wires A and laterally the distance of the guide-rod E.

The device is simple and compact, and can be readily set up and taken down and moved from place to place.

Having thus described my invention, what I claim, and desire to secure by Letters Patent, is—

The herein-described tether, composed of the two parallel wires A, anchored at each end, the braces $a$, for holding the main portion of the wires above the ground, the cross-bar or yoke C, mounted at its ends upon the wires, the guide-rod E, attached to the yoke C, and the halter applied to the guide-rod, substantially as and for the purpose set forth.

In testimony whereof I affix my signature in presence of two witnesses.

BENJAMIN LEE MITCHELL.

Witnesses:
   E. E. TITUS,
   ANTON STORBER.